United States Patent
Imoto et al.

(10) Patent No.: US 8,993,679 B2
(45) Date of Patent: Mar. 31, 2015

(54) METHOD FOR PRODUCING AQUEOUS DISPERSION OF FLUORINE-CONTAINING SEED POLYMER PARTICLES AND AQUEOUS COATING COMPOSITION AND COATED ARTICLE THEREOF

(75) Inventors: Katsuhiko Imoto, Settsu (JP); Shumi Nishii, Settsu (JP); Yoshinari Fukuhara, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 675 days.

(21) Appl. No.: 13/255,742

(22) PCT Filed: Mar. 11, 2010

(86) PCT No.: PCT/JP2010/054088
§ 371 (c)(1),
(2), (4) Date: Sep. 9, 2011

(87) PCT Pub. No.: WO2010/104142
PCT Pub. Date: Sep. 16, 2010

(65) Prior Publication Data
US 2012/0004367 A1    Jan. 5, 2012

(30) Foreign Application Priority Data

Mar. 12, 2009 (JP) .................................. 2009-059644
Nov. 25, 2009 (JP) .................................. 2009-267480

(51) Int. Cl.
| | |
|---|---|
| C08F 2/24 | (2006.01) |
| C08F 214/00 | (2006.01) |
| C09D 5/02 | (2006.01) |
| C09D 127/12 | (2006.01) |
| C09D 129/10 | (2006.01) |
| C08F 214/18 | (2006.01) |
| C08F 14/18 | (2006.01) |
| C09D 127/16 | (2006.01) |

(52) U.S. Cl.
CPC ............... *C08F 214/18* (2013.01); *C08F 14/18* (2013.01); *C08F 214/186* (2013.01); *C09D 5/02* (2013.01); *C09D 127/12* (2013.01); *C09D 127/16* (2013.01)
USPC ............ 525/201; 524/458; 524/544; 524/545

(58) Field of Classification Search
CPC ........... C08F 2/24; C08F 214/00; C09D 5/02; C09D 127/12; C09D 129/10
USPC ........................ 526/201; 524/458, 544, 545
See application file for complete search history.

(56) References Cited

U.S. PATENT DOCUMENTS

| | | | | |
|---|---|---|---|---|
| 6,350,806 | B1 * | 2/2002 | Tsuda et al. ................... | 524/492 |
| 6,361,865 | B1 * | 3/2002 | Tsuda et al. ................... | 428/412 |
| 6,447,620 | B1 | 9/2002 | Komiyama et al. | |
| 6,800,679 | B2 * | 10/2004 | Wada et al. ................... | 524/148 |
| 2004/0019145 | A1 * | 1/2004 | Imoto et al. ................... | 524/502 |

FOREIGN PATENT DOCUMENTS

| | | |
|---|---|---|
| CN | 1304432 A | 7/2001 |
| EP | 0982080 A1 | 3/2000 |
| EP | 1331257 A1 | 7/2003 |
| JP | 20P00-053910 A | 2/2000 |
| JP | 2000-053910 A | 2/2000 |
| JP | 2000-212500 A | 8/2000 |
| JP | 2004-250531 A | 9/2004 |

* cited by examiner

*Primary Examiner* — Kelechi Egwim
(74) *Attorney, Agent, or Firm* — Sughrue Mion, PLLC

(57) ABSTRACT

There is provided a method for producing an aqueous dispersion of fluorine-containing seed polymer (B) particles, comprising a step for preparing an aqueous dispersion of fluorine-containing polymer (A) particles by polymerizing monomer comprising at least one fluoroolefin in an aqueous dispersion in the presence of a compound (1) represented by the formula: $CH_2=CHCH_2—O—R$, wherein R is a hydrocarbon group which may have an oxygen atom, a nitrogen atom and/or a polar group, and (II) a step for seed-polymerizing ethylenically unsaturated monomer with the fluorine-containing polymer (A) particles in the aqueous dispersion of the fluorine-containing polymer (A) particles. The production method is the method for producing an aqueous dispersion of fluorine-containing seed polymer particles and assures a low foamability and gives an excellent gloss of an obtained coating film and excellent adhesion to a substrate when the fluorine-containing seed polymer particles are used as a coating film forming component of a coating composition.

5 Claims, No Drawings

METHOD FOR PRODUCING AQUEOUS DISPERSION OF FLUORINE-CONTAINING SEED POLYMER PARTICLES AND AQUEOUS COATING COMPOSITION AND COATED ARTICLE THEREOF

CROSS REFERENCE TO RELATED APPLICATIONS

This application is a National Stage of International Application No. PCT/JP2010/054088 filed Mar. 11, 2010, claiming priority based on Japanese Patent Application Nos. 2009-059644 filed Mar. 12, 2009 and 2009-267480 filed Nov. 25, 2009, the contents of all of which are incorporated herein by reference in their entirety.

TECHNICAL FIELD

The present invention relates to a method for producing an aqueous dispersion of fluorine-containing seed polymer particles in which fluorine-containing polymer particles obtained in the presence of a non-fluorine-containing compound having surface activating capability are used.

BACKGROUND ART

Fluorine-containing polymers have excellent chemical resistance, solvent resistance, heat resistance and antifouling property and thus have been used as a starting material of various products utilizing these properties in various industrial fields such as automobile industry, semiconductor industry, chemical industry and coatings.

The production of these fluorine-containing polymers has been performed by an emulsion polymerization, a suspension polymerization or a solution polymerization of a fluoroolefin. Generally, a surfactant is used in the emulsion polymerization method, and as the amount of the surfactant to be used increases, the number of polymer particles formed in the initial period of the emulsion polymerization increases. As a result, the polymerizing speed becomes fast and the production efficiency of the fluorine-containing polymer improves. However, the use of a large amount of surfactant tends to decrease various properties such as water resistance of the obtained fluorine-containing polymer. Therefore, the development of the production method which can perform a polymerization efficiently in the presence of a small amount of surfactant and does not have a bad influence on various properties of the fluorine-containing polymer has been desired.

In such circumstances, a production method of a fluorine-containing polymer in which a surfactant of a straight chain aliphatic sulfonates is used, in order to replace an expensive ammonium perfluorooctanoate which is generally used in the emulsion polymerization of a fluorine-containing polymer, is proposed (Patent Document 1). However, this method has a problem that the number of generated particles is small.

Further, a production method using an alkyl phosphoric acid or an ester thereof (Patent Documents 2 and 3) and a method using a compound in which a phosphoric acid, a sulfonic acid, a carboxylic acid or the like is bonded to a quaternary carbon atom (Patent Document 4) are proposed as a method using a non-fluorine-containing surfactant.

However, in the case of using an alkyl phosphoric acid or an ester thereof, the method is not always enough in terms of the number of generated particles, a polymerizing speed, a molecular weight of the obtained polymer, a polymer concentration of an aqueous dispersion, a polymerizing temperature, a polymerizing pressure and the like. Also, in the method using a compound in which a phosphoric acid, a sulfonic acid, a carboxylic acid or the like is bonded to a quaternary carbon atom, a further increase of generated particles is desired.

On the other hand, fluorine-containing materials are expensive, and the amount to be used thereof is tried to be decreased. One example is a method of seed-polymerizing ethylenically unsaturated monomer such as an acrylic acid with fluorine-containing polymer particles (Patent Document 5).

PRIOR ART DOCUMENTS

Patent Documents

Patent Document 1: U.S. Pat. No. 6,512,063
Patent Document 2: U.S. 2007/0032591 A
Patent Document 3: U.S. 2007/0018783 A
Patent Document 4: WO 2005/063827
Patent Document 5: JP 8-067795 A

DISCLOSURE OF THE INVENTION

Problem to be Solved by the Invention

However, when a fluorine-containing seed polymer in which the fluorine-containing polymer particles obtained in the above conventional production method are used for a seed polymerization is used for a coating composition, the adhesion with a substrate may be insufficient and an emulsifier may melt in rain water and cause bubbling extremely in the case it rains right after the coating.

An object of the present invention is to provide a method of producing an aqueous dispersion of fluorine-containing polymer particles, which is low in foamability and excellent in gloss of the obtained coating film and adhesion with a substrate when used as a coating film forming component of a coating composition.

Means to Solve the Problem

That is, the present invention relates to a production method of an aqueous dispersion of fluorine-containing seed polymer (B) particles comprising:
(I) a step for producing an aqueous dispersion of fluorine-containing polymer (A) particles by polymerization of monomers comprising at least one fluoroolefin in an aqueous dispersion in the presence of a compound (1) represented by the formula (1)

$$CH_2=CHCH_2-O-R \qquad (1)$$

wherein R is a hydrocarbon group which may have an oxygen atom, a nitrogen atom and/or a polar group, and
(II) a step for seed-polymerizing an ethylenically unsaturated monomer with fluorine-containing polymer (A) particles in the aqueous dispersion of fluorine-containing polymer (A) particles.

In the step (II) of the present invention, it is preferable to allow the compound (1) to exist in the polymerization system.

Further, in the present invention, it is preferable to contain at least one fluoroolefin selected from the group consisting of vinyl fluoride, vinylidene fluoride, tetrafluoroethylene, hexafluoropropylene and chlorotrifluoroethylene.

The present invention further relates to an aqueous coating composition comprising the fluorine-containing seed polymer (B) particles obtained by the production method of the present invention and to a coated article having a coating film formed by coating the aqueous coating composition of the present invention.

Effect of the Invention

According to the present invention, an aqueous dispersion of fluorine-containing polymer particles, which is low in foamability and excellent in gloss of the obtained coating film and adhesion with a substrate when used as a coating film forming component of the aqueous coating composition can be produced.

EMBODIMENT FOR CARRYING OUT THE INVENTION

The production method of the present invention comprises: the step (I) for producing an aqueous dispersion of fluorine-containing polymer (A) particles by polymerization of monomer comprising at least one fluoroolefin in an aqueous dispersion in the presence of the compound (1) represented by the above formula (1), and
the step (II) for producing an aqueous dispersion of fluorine-containing seed polymer (B) particles by seed-polymerizing ethylenically unsaturated monomer with the fluorine-containing polymer (A) particles in the aqueous dispersion of fluorine-containing polymer (A) particles.

Each step will be explained below.
Step (I)
The method of producing an aqueous dispersion of fluorine-containing polymer (A) particles by polymerization of monomer comprising at least one fluoroolefin in an aqueous dispersion in the presence of the compound (1) represented by the formula (1), $$CH_2=CHCH_2-O-R \quad (1)$$

wherein R is a hydrocarbon group which may have an oxygen atom, a nitrogen atom and/or a polar group is a novel method.

R of the compound (1) represented by the formula (1) is a hydrocarbon group which may have an oxygen atom, a nitrogen atom and/or a polar group. The hydrocarbon group R may have two or more kinds of an oxygen atom, a nitrogen atom and a polar group. Further, the hydrocarbon group R may be a straight or branched one. The molecule weight is preferably 45 to 5,000.

A polar group may be at the end of the hydrocarbon group R or at the end of a branched chain. Examples of a polar group are the groups represented by $-L^-M^+$ ($L^-$ is $SO_3^-$, $OSO_3^-$, $PO_3^-$, $OPO_3^-$, $COO^-$ or the like; $M^+$ is a monovalent cation, for example, lithium ion, potassium ion, sodium ion, rubidium ion, cesium ion, ammonium ion or the like).

Preferable examples of the compound represented by the formula (1) are a compound (2) in which R in the formula (1) is represented by the formula (2):

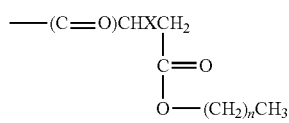

wherein X is H or $SO_3Y$ (Y is $NH_4$ or an alkali metal atom such as Na or K); n is an integer of 0 to 19,
a compound (3) in which R in the formula (1) is represented by the formula (3):

$$-(AO)_p-X \quad (3)$$

wherein AO is a straight chain or branched chain oxyalkylene group having 2 to 4 carbon atoms; p is a positive integer; X is H or $SO_3Y$ (Y is $NH_4$ or an alkali metal atom such as Na or K); and AO may be the same or different when plural and may form two or more block structures, or a compound (4) in which R in the formula (1) is represented by the formula (4):

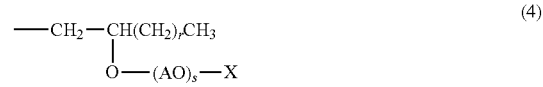

wherein AO is a straight chain or branched chain oxyalkylene group having 2 to 4 carbon atoms; X is H or $SO_3Y$ (Y is $NH_4$ or an alkali metal atom such as Na or K); r is an integer of 0 to 20; s is a positive integer; and AO may be the same or different when plural and may form two or more block structures.

A preferable example of the compound (2) with R represented by the formula (2) is a compound represented by the formula:

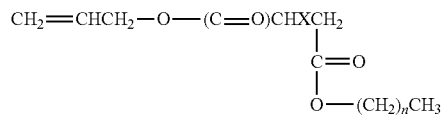

wherein n is 11 or 12; and X is the same as that of the formula (2). An example of a commercial product is ELEMINOL JS-20 manufactured by Sanyo Chemical Industries, Ltd. or the like.

A preferable example of the compound (3) with R represented by the formula (3) is a compound represented by the formula:

$$CH_2=CR^1-R^2-O-(AO)_p-X$$

wherein $R^1$ is a hydrogen atom or an alkyl group; $R^2$ is an alkylene group having two or more carbon atoms; AO is a straight or branched chain oxyalkylene group having 2 to 4 carbon atoms; p is a positive integer; X is H or $SO_3Y$ (Y is $NH_4$ or an alkali metal atom); and AO may be the same or different when plural and may form two or more block structures.

$R^1$ is a hydrogen atom or an alkyl group, and an alkyl group, especially a methyl group having 1 to 10 carbon atoms is preferable in view of the fact that the stability of a dispersion to be obtained is good.

$R^2$ is an alkylene group having two or more carbon atoms and may have a straight or branched chain. Among these, an alkylene group having 2 to 10 carbon atoms, especially a straight chain alkylene group having 2 to 4 carbon atoms is preferable in view of the fact that the stability of a dispersion is good.

AO is a straight or branched oxyalkylene group having 2 to 4 carbon atoms, such as ethylene oxide ($-CH_2CH_2O-$), propylene oxide, butylene oxide, tetrahydrofuran or $-CH(CH_3)O-$ and can be obtained by a method such as a addition polymerization of alkylene oxide. When AO is formed by an addition polymerization of alkylene oxide, AO is determined by an alkylene oxide to be added or the like. A method of polymerization of an alkylene oxide or the like to be added is not limited and may be a homopolymerization of one alkylene oxide, a random copolymerization, block copolymerization or random/block copolymerization of two or more alkylene oxides.

p is a positive integer and preferably, for example, 0 to 1,000, further 1 to 200 and especially 1 to 40.

In particular, a preferable example of the compound (3) is a compound represented by the formula:

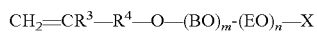

wherein $R^3$ is an alkyl group having 1 to 10 carbon atoms; $R^4$ is a straight chain alkylene group having 2 to 10 carbon atoms; X is the same as that of the formula (1); BO is a butylene oxide unit; EO is $CH_2CH_2O$ or $CH(CH_3)O$ unit; m is an integer of 0 to 50; n is an integer of 0 to 100; m+n is an integer of 0 to 150.

Specific examples of the compound (3) are as follows while not limited thereto.
That is, compounds represented by the formulas:

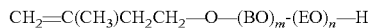

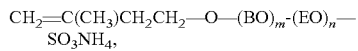

wherein BO, EO, n and m are as defined above are preferable.

Examples of commercial products are LATEMUL PD-104, PD-420 and the like manufactured by Kao Co., Ltd.

In addition, a preferable compound (4) with R represented by the formula (4) is a compound represented by the formula:

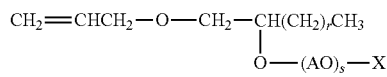

wherein AO, X, r and s are as defined in the formula (4). Additionally, explanation and exemplification of AO are as defined in the formula (3).

An example of a commercial product is AQUALON KH-10 manufactured by Dai-ichi Kogyo Seiyaku Co., Ltd. or the like.

Fluoroolefins to be polymerized by the production method of the present invention are not limited particularly, and one or more fluoroolefins can be used. Examples of fluoroolefins are perfluoroolefins such as tetrafluoroethylene (TFE), hexafluoropropylene (HFP), perfluoro(alkyl vinyl ether) (PAVE),

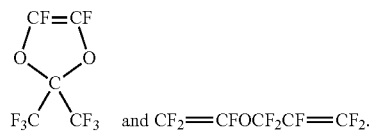

and non-perfluoroolefins such as chlorotrifluoroethylene (CTFE), vinyl fluoride (VF), vinylidene fluoride (VdF), trifluoroethylene, trifluoropropylene, pentafluoropropylene, tetrafluoropropylene, and hexafluoroisobuthne. Examples of PAVE are perfluoro(methyl vinyl ether) (PMVE), perfluoro (ethyl vinyl ether) (PEVE), perfluoro(propyl vinyl ether) (PPVE) and the like.

Moreover, a functional group-containing fluoroolefin monomer can be also used. An example of a functional group-containing fluoroolefin is the compound represented by the formula (5):

wherein $Y^1$ is —OH, —COOH, —SO$_2$F, —SO$_3$M$^2$ (M$^2$ is a hydrogen atom, NH$_4$ group or alkali metal), carboxylate, carboxy ester group, epoxy group or cyano group; $X^1$ and $X^2$ are the same or different and each is a hydrogen atom or a fluorine atom; $R_f$ is a divalent fluorine-containing alkylene group having 1 to 40 carbon atoms or a divalent fluorine-containing alkylene group containing ether bond and having 1 to 40 carbon atoms; and m is 0 or 1.

Specific examples thereof are, for example,

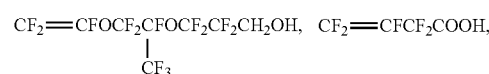
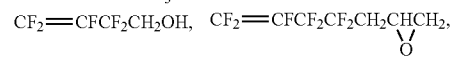
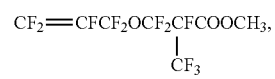
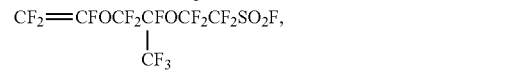
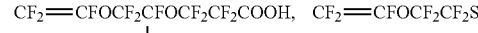
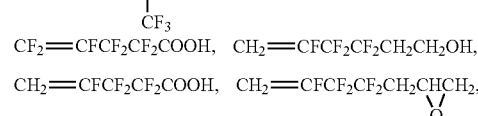
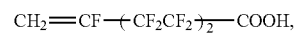
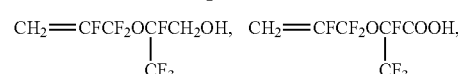
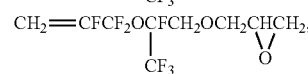
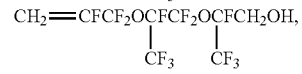
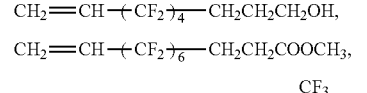

and the like.

Iodine containing-monomer, for example, iodides of perfluorovinylethers such as perfluoro(6,6-dihydro-6-iodo-3-oxa-1-hexene) and perfluoro(5-iodo-3-oxa-1-pentene) described in JP 5-063482 B or JP 62-012734 A can be also used as a non-perfluoroolefin.

In the present invention, a non-fluorine-containing monomer which is copolymerizable with a fluoroolefin may be used in combination.

In the present invention, the polymerization is carried out in an aqueous dispersion in the presence of the compound (1) (surfactant). Examples of polymerization in an aqueous dispersion are emulsion polymerization or suspension polymerization, and emulsion polymerization is preferable in view of the fact that many polymer particles having an especially small particle size are generated. In particular, emulsion polymerization applied to the initial stage of the seed polymerization, that is, the production of seed particles is preferable in view of the fact that the number of particles can be increased even if the amount of a surfactant in the obtained fluorine containing-polymer is the same.

In the case of emulsion polymerization for example, it is preferable that the amount of the compound (1) to be used is 10 to 5,000 ppm, more preferably 20 to 4,000 ppm based on the total water amount. When the amount of the compound (1) is less than 10 ppm, surface activating capability is reduced and the number of particles to be generated tends to be decreased.

In addition, though the emulsion polymerization stably proceeds enough when the compound (1) is used alone, other surfactants can be used in combination.

Other surfactants may be fluorine containing-surfactants or non-fluorine-containing (hydrocarbon) surfactants (except the compound of the formula (1)).

A fluorine-containing anionic surfactant is preferable as a fluorine-containing surfactant.

Known fluorine-containing anionic surfactants can be used, and examples thereof are described in U.S. 2007/0015864 A, U.S. 2007/0015865 A, U.S. 2007/0015866 A, U.S. 2007/0276103 A, U.S. 2007/0117914 A, U.S. 2007/142541 A, U.S. 2008/0015319 A, U.S. Pat. No. 3,250,808 B, U.S. Pat. No. 3,271,341 B, JP 2003-119204 A, WO 2005/042593, WO 2008/060461, WO 2007/046377, WO 2007/119526, WO 2007/046482 and WO 2007/046345.

Specific examples of a fluorine-containing surfactant which can be used in combination are for example, $F(CF_2)_nCOOM$, $CF_3CF_2CF_2OCF(CF_3)CF_2OCF(CF_3)COOM$, $CF_3CF_2OCF(CF_3)CF_2OCF(CF_3)COOM$, $CF_3OCF(CF_3)CF_2OCF(CF_3)COOM$, $H(CF_2CF_2)_2CH_2OCF(CF_3)COOM$, $H(CF_2)_mCOOM$, $C_6F_{13}CH_2CH_2SO_3M$, $F(CF_2CF_2)_pCH_2CH_2SO_3M$, and $F(CF_2CF_2)_qCH_2CH_2SO_4M$, wherein M is a monovalent cation; n is an integer of 2 to 5; m is an integer of 2 to 10; p is an integer of 2 to 10; and q is an integer of 2 to 10.

Among these, a fluorine-containing surfactant having 6 or less of carbon atoms, especially a fluorine-containing anionic surfactant having 6 or less of carbon atoms is preferable, in view of the fact that the concentration of a fluorine-containing polymer in the obtained reaction product solution can be increased and the dispersion is stabilized.

Further, examples of a non-fluorine-containing (hydrocarbon) surfactant are, for example, hydrocarbon surfactants such as $CH_3(CH_2)_rSO_3M$, $CH_3(CH_2)_sSO_4M$, $CH_3(CH_2)_tCOOM$, $H(CH_2)_uCOO(CH_2CH_2O)_vH$, and $(NaSO_3)CH((CH_2)_wCH_3)((CH_2)_xCH_3)$, wherein M is a monovalent cation; r is an integer of 2 to 16; s is an integer of 2 to 16; t is an integer of 2 to 16; u is an integer of 2 to 40; v is an integer of 2 to 45; and w+x=10 to 20.

In the case of emulsion polymerization for example, it is preferable that the total amount of other surfactants which are able to be used in combination and the compound (1) is 10 to 5,000 ppm, more preferably 20 to 4,000 ppm, based on the total water amount. When the total amount of the compound (1) and other surfactants is less than 10 ppm, surface activating capability is reduced and the number of particles to be generated tends to be decreased.

Further, another example of a surfactant which is able to be used in combination is a fluorine-containing reactive surfactant comprising a fluorine-containing compound having a radically polymerizable unsaturated bond and a hydrophilic group in its molecule. The fluorine-containing reactive surfactant, when being present in the reaction system during the polymerizing, can configure a part of a polymer chain of the polymer.

For example, a fluorine-containing compound described in JP 8-067795 A can be used as a reactive surfactant.

The polymerization temperature is not limited particularly and an optimal temperature is adopted according to kind of a polymerization initiator. However, if the temperature is too high, a monomer density in the gaseous phase may easily decrease or a branch reaction of the polymer may be caused, and thus an objective copolymer may not be obtained. The temperature is preferably 40 to 120° C., more preferably 50 to 100° C.

The supply of the monomer may be continuous or one after another.

Though an oil soluble peroxide can be used as a polymerization initiator, peroxycarbonates such as diisopropyl peroxydicarbonate (IPP) and di-n-propyl peroxydicarbonate (NPP), which are typical oil soluble polymerization initiators, are expensive in addition to having a risk of explosion or the like. Moreover, they have a problem of easily causing an adhesion of a scale on a wall surface of a polymerization reactor during the polymerization reaction. In order to further reduce permanent compression set of the fluoropolymer, it is preferable to use a water soluble radical polymerization initiator. Preferable examples of a water soluble radical polymerization initiator are, for example, ammonium salt, potassium salt, sodium salt and the like of persulfuric acid, perboric acid, perchloric acid, perphosphoric acid and percarbonic acid, and ammonium persulfate and potassium persulfate are especially preferable.

The amount of a polymerization initiator to be added is not limited particularly, and more than the amount to such a degree that the polymerization speed is not significantly reduced (for example, several ppm based on the water concentration) can be added at once at the initial stage of the polymerization, or can be added one after another or continuously. The upper limit is in the range where the polymerization reaction heat can be removed in view of machinery performance.

In the production method of the present invention, a molecular weight controlling agent or the like can be further added. A molecular weight controlling agent may be added at once at the initial stage, or added continuously or separately.

Examples of the molecular weight controlling agent are esters such as dimethyl malonate, diethyl malonate, methyl acetate, ethyl acetate, butyl acetate and dimethyl succinate: isopentane, isopropanol, acetone, various mercaptans, carbon tetrachloride, cyclohexane, monoiodomethane, 1-iodomethane, 1-iodopropane, isopropyl iodide, diiodomethane, 1,2-diiodomethane, 1,3-diiodopropane and the like.

In addition, though a buffer or the like can be added as necessary, the amount thereof is preferably to such an extent not to impair the effect of the present invention.

The polymerization pressure can be selected as necessary within the range of 0.1 to 10 MPa, further 0.2 to 8 MPa, and may be either low pressure (0.1 to 1 MPa) or high pressure (1 to 10 MPa) as long as within this range.

Though an anchor impeller, a turbine impeller, an inclined impeller or the like may be used as a stirring meaning, stirring with a large impeller, which is referred to as Full Zone or Max Blend, is preferable from the viewpoint of good diffusion of a monomer and good dispersion stability of a polymer. The stirring apparatus may be a horizontal stirring apparatus or a vertical stirring apparatus.

In the step (I) of the present invention, an aqueous dispersion of a fluorine-containing polymer can be stably obtained even if the concentration of the fluorine-containing polymer in the reaction product solution is increased. For example, when the compound represented by the formula (1) is used alone, a stable aqueous dispersion of a fluorine-containing polymer can be obtained even if the concentration of the fluorine-containing polymer is approximately 45% by mass. On the other hand, when a fluorine-containing surfactant, especially a fluorine-containing anionic surfactant having 6 or less carbon atoms is blended, an aqueous dispersion of a fluorine-containing polymer having a high concentration exceeding 45% by mass, for example, the concentration of 45 to 55% by mass can be obtained in the stable state.

Fluorine-containing polymer (A) particles obtained in the step (1) has a number average particle size of approximately 100 to 200 nm, a number average molecular weight of approximately $1.0 \times 10^4$ to $1.0 \times 10^6$, and a sharp molecular weight distribution (Mw/Mn) of approximately 2 to 5. The number of particles in the aqueous dispersion is $1 \times 10^{14}$ to $1 \times 10^{15}/1$ g of water.

Step (II)

In the step (II), the aqueous dispersion of the fluorine-containing polymer (A) particles obtained in the step (I) is used as it is or the aqueous dispersion diluted with water in which the number of particles are controlled is used, and ethylenically unsaturated monomer is seed-polymerized with the fluorine-containing polymer (A) particles.

The seed polymerization to be conducted in the step (II) is a known polymerization method (for example, JP 8-067795 A or the like), in which ethylenically unsaturated monomer is added to the aqueous dispersion of polymer particles and the ethylenically unsaturated monomer is polymerized in the aqueous dispersion, with the polymer particles (seed particles) as a core.

An example of polymerization in an aqueous dispersion is emulsion polymerization or suspension polymerization similarly to the step (I), and emulsion polymerization is preferable in view of an easy homogenization of the polymer particles. Known conditions for the seed polymerization can be adopted in the step (II) of the present invention.

In addition, though the emulsion polymerization stably proceeds enough when the compound (1) is used alone, other surfactants can be blended. The kind and amount of the compounds exemplified in the step (I) can be also adopted in the step (II) as other surfactants to be used.

It is preferable that, for example, in the case of emulsion polymerization, the amount of the compound (1) to be used in the step (II) is 10 to 5,000 ppm, more preferably 20 to 4,000 ppm based on the total water amount. When the amount of the compound (1) is less than 10 ppm, surface activating capability is reduced and the stable aqueous dispersion tends to be hardly obtained.

Monomer with a radically polymerizable ethylenically unsaturated bond can be used as ethylenically unsaturated monomer to be seed-polymerized in the step (II), and preferable examples thereof are esters of acrylic acid or methacrylic acid, unsaturated carboxylic acids, hydroxyl group-containing alkyl vinyl ethers, vinyl esters of carboxylic acids, α-olefins and the like.

Examples of esters of acrylic acid or methacrylic acid are alkyl esters having 1 to 10 carbon atoms, for example, one or more of (metha)acrylic acids such as methyl acrylate, ethyl acrylate, n-propyl acrylate, isopropyl acrylate, n-butyl acrylate, methyl methacrylate, n-propyl methacrylate, ethyl methacrylate, n-butyl methacrylate, isopropyl methacrylate, 2-ethylhexyl acrylate, 2-ethylhexyl methacrylate, cyclohexyl acrylate, cyclohexyl methacrylate and the like, in view of a good compatibility with the fluorine-containing polymer (A).

Specific examples of the unsaturated carboxylic acid are, for instance, acrylic acid, methacrylic acid, vinylacetic acid, crotonic acid, cinnamic acid, 3-allyloxypropionic acid, 3-(2-allyloxyethoxycarbonyl)propionic acid, itaconic acid, itaconic acid monoester, maleic acid, maleic acid monoester, maleic anhydride, fumaric acid, fumaric acid monoester, vinyl phthalate, vinyl pyromellitate, undecylenic acid and the like. Among them, vinylacetic acid, crotonic acid, itaconic acid, maleic acid, maleic acid monoester, fumaric acid, fumaric acid monoester, 3-allyloxypropionic acid and undecylenic acid which are low in homo-polymerizability are preferred because a homopolymer is hardly produced and introduction of a carboxyl group is easily controlled.

Specific examples of the hydroxyl group-containing alkyl vinyl ethers are, for instance, 2-hydroxyethyl vinyl ether, 3-hydroxypropyl vinyl ether, 2-hydroxypropyl vinyl ether, 2-hydroxy-2-methylpropyl vinyl ether, 4-hydroxybutyl vinyl ether, 4-hydroxy-2-methylbutyl vinyl ether, 5-hydroxypentyl vinyl ether, 6-hydroxyhexyl vinyl ether, 2-hydroxyethyl allyl ether, 4-hydroxybutyl allyl ether, glycerol monoallyl ether and the like. Among them, 4-hydroxybutyl vinyl ether and 2-hydroxyethyl vinyl ether are preferred from the viewpoint of excellent polymerization reactivity.

Specific examples of the vinyl esters of carboxylic acid are, for example, vinyl acetate, vinyl propionate, vinyl butyrate, vinyl isobutyrate, vinyl pivalate, vinyl caproate, vinyl versatate, vinyl laurate, vinyl stearate, vinyl cyclohexylcarboxylate, vinyl benzoate, vinyl para-t-butylbenzoate and the like which can impart characteristics such as enhancement of gloss of a coating film and increasing of glass transition temperature.

Examples of the α-olefins are, for instance, ethylene, propylene, n-butene, isobutene and the like which can impart characteristics such as enhancement of flexibility.

It is preferable that the amount of the ethylenically unsaturated monomer used in the seed polymerization is 5 to 400 parts by mass, further 10 to 150 parts by mass based on 100 parts by mass of the fluorine-containing polymer particles (A) (solid content).

The fluorine-containing seed polymer (B) particles obtained via the steps (I) and (II) have an average particle size of approximately 110 to 300 nm, a number average molecular weight of approximately $1.0 \times 10^4$ to $1.0 \times 10^6$, and a sharp molecular weight distribution (Mw/Mn) of approximately 1.5 to 4.0. The number of particles in the aqueous dispersion is $1 \times 10^{12}$ to $1 \times 10^{15}/1$ g of water.

The aqueous composition of the present invention can be applied to various uses as it is or by being modified appropriately. The representative intended use thereof is for example, various coatings, especially aqueous coating compositions and it is also useful as a forming material of a film or a sheet.

The present invention further relates to an aqueous coating composition including the fluorine-containing seed polymer (B) particles obtained by the production method of the present invention.

In the aqueous coating composition of the present invention, the fluorine-containing seed polymer (B) particles are used as a film forming material, and known additives and proportions thereof can be adopted. For example, the concentration of the fluorine-containing seed polymer (B) particles can be selected from, for example, the range of approximately 10 to 60% by mass.

Moreover, when the aqueous coating composition containing a pigment is prepared, a predetermined amount of a pigment dispersion in which water, a pigment such as titanium oxide, an antifoaming agent, a pigment dispersing agent, a pH controlling agent or the like are previously dispersed with a pigment dispersing machine such as a sand mill, and a predetermined amount of film forming auxiliaries are mixed to the aqueous dispersion of the fluorine-containing seed polymer (B) particles with stirring. After that, a predetermined amount of a thickener is added and mixed and then other necessary additives may be added as necessary. In the case of preparing the aqueous coating composition in which a pigment is not added, water, film forming auxiliaries, an antifoaming agent, a thickener, a pH controlling agent and other necessary additives may be added to the aqueous dispersion of the fluorine-containing seed polymer (B) particles according to need, followed by stirring and mixing with a known method.

Additives such as a film forming auxiliary, an antifreezing agent, a pigment, a filler, a pigment dispersing agent, an antifoaming agent, a leveling agent, a rheology controlling agent, an antiseptic agent, an ultraviolet light absorbing agent, an antioxidant, a delustering agent, a lubricant, a vulcanizing agent and the like may be also added according to need for coating application.

For coating the aqueous coating composition of the present invention, known coating methods and conditions can be adopted. For example, after forming a coating film by applying the composition on a substrate with a coating method such as spray coating, roll coating, flow coating and a coating method using a roller or a brush, the coating film is dried at 5 to 200° C., thereby enabling formation of a coating film which has excellent gloss, less foaming and satisfactory hot water resistance, and does not easily deteriorate even if freezing and thawing are repeated.

The coated article obtained by applying the aqueous coating composition of the present invention can be used for wide applications such as the interior and exterior of electric appliances (electronic range, toaster, refrigerator, washing machine, hair dryer, television set, video deck, amplifier, radio, electric pot, rice cooker, cassette deck with a radio, cassette deck, compact disc player, video camera, etc.); the interior and exterior of an air conditioner, i.e. indoor unit, outdoor unit, air blow-off port and duct, air cleaner, heater, etc.; illumination appliances, i.e. fluorescent lamp, chandelier and reflection panel; furniture, machine parts, decorative parts, comb, frame for glasses, natural fiber, synthetic fiber (fiber in the form of a string and a fabric obtained therefrom), the interior and exterior of office apparatuses (phone, facsimile machine, copying machine (including a roll), camera, overhead projector, epidiascope, clock, slide projector, desk, bookshelf, locker, document rack, chair, book ends, electronic white board, etc.); automobiles (wheel, door mirror, metal braid, door knob, number plate, steering wheel, instrument panel, etc.); kitchen appliances (range hood, sink, kitchen table, cooking knife, chopping board, water tap, gas range, ventilation fan, etc.); interior decoration of partition panel, bath unit, shutter, blind, curtain rail, accordion curtain, wall, ceiling, floor, etc.; the exterior of a house such as outside wall, handrail, door and shutter; the exterior of buildings; exterior materials for buildings such as ceramic siding material, foamed concrete panel, concrete panel, aluminum curtain wall, steel panel, zinc-plated steel sheet, stainless steel sheet, vinyl chloride sheet, PET film, polycarbonate, acrylic film etc.; window glass and other wide applications.

EXAMPLE

The present invention is then explained by means of examples, but is not limited to such examples.

Equipment used for evaluating characteristics and measuring conditions are as follows.

(1) Average Particle Size
Measuring equipment: Microtrac UPA available from Honeywell
Measuring method: Dynamic light scattering method
An emulsion to be measured is diluted with pure water up to a measurable concentration to make a sample, and an average particle size is measured at room temperature. An average particle size of the obtained data is assumed to be an average particle size.

(2) Number of Particles
Calculation method: The number of particles is calculated from the average particle size obtained in (1) above and a solid content, assuming that a specific gravity of the polymer is 1.8.

(3) NMR Analysis
NMR measuring equipment: available from VARIAN
$^1$H-NMR measuring condition: 400 MHz (tetramethylsilane=0 ppm)
$^{19}$F-NMR measuring condition: 376 MHz (trichlorofluoromethane=0 ppm)

(4) Analysis of Molecular Weight
Shodex GPC-104 available from SHOWA DENKO K.K. is used, and a weight average molecular weight and a number average molecular weight converted based on standard polystyrene are obtained.
Measuring Conditions:
  Carrier: Tetrahydrofuran
  Flow rate: 0.6 ml/min
  Column temperature: 40° C.
  Sample: 3% THF solution of a resin to be measured (5) Melt Flow Rate (MFR) Value
By using Dynisco melt index tester available from Yasuda-Seiki-Seisakusho, Ltd., about 6 g of a resin is poured into a 0.376 inch ID cylinder being kept at 250° C.±0.5° C., and after a temperature reached an equilibrium state by allowing the resin to stand for five minutes, the resin is extruded through an orifice having a diameter of 0.0825 inch and a length of 0.315 inch under a load of piston of 10 Kg. An average value of the data obtained by extruding three times at nearly the same time is used A unit is g/10 min.

(6) Foamability
Coated test plates are dried at 23° C. for one day and two coated test plates are immersed in 1 kg of water of 23° C. for three days. Then 50 g of water used for the immersing was poured in a 100 ml glass bottle and the bottle was shook up 50 times by hand. A height of foaming from the water level is measured immediately after the shaking and 30 minutes after the shaking.

(7) Hot Water Resistance Test
A coated test plate is dried at 23° C. for seven days, and then is immersed in water of 60° C. for seven days and is dried at 23° C. for one day according to JIS K5600-6-2. Then, degrees of swelling (JIS K5600-8-2), cracking (JIS K5600-8-4) and peeling (JIS K5600-8-5) are evaluated.

Criteria for Evaluating a Degree of Swelling (JIS K5600-8-2)
A density of swelling is classified into the degrees of 0 to 5 (when the degree is 0, the density is smaller), and a size of swelling is classified into the degrees of S1 to S5 (when the degree is S1, the size is smaller). The degree is indicated, for example, as 2(S1).

Criteria for Evaluating a Degree of Cracking (JIS K5600-8-4)
A density of cracking is classified into the degrees of 0 to 5 (when the degree is 0, the density is smaller), a size of cracking is classified into the degrees of S0 to S5 (when the degree is S0, the size is smaller), and a depth of cracking is classified into the degrees of a to c (when the degree is a, the depth is smaller). The degree is indicated, for example, as 2(S1)b.

Criteria for Evaluating a Degree of Peeling (JIS K5600-8-5)

A density of cracking is classified into the degrees of 0 to 5 (when the degree is 0, the density is smaller), a size of peeling is classified into the degrees of S1 to S5 (when the degree is S1, the size is smaller), and a depth of peeling is classified into the degrees of a to b (when the degree is a, the depth is smaller). The degree is indicated, for example, as 2(S1)a.

(8) Resistance to Freezing and Thawing

A coated test plate is dried at 23° C. for seven days, is allowed to stand in the air at −20° C. for two hours, and then is immersed in water of 10° C. for two hours. After repeating this cycle 100 times, the coated test plate is dried at 23° C. for one day, and degrees of swelling (JIS K5600-8-2), cracking (JIS K5600-8-4) and peeling (JIS K5600-8-5) are evaluated in the same manner as in the hot water resistance test.

(9) Low Temperature Film Forming Property Test

According to JIS 5663 7.7.3, a test plate is dried at 5±1° C. for four hours and then is immersed in water of 5±2° C. for 16 hours and is dried at 5±1° C. for three hours. Then, degrees of swelling (JIS 5600-8-2), cracking (JIS 5600-8-4) and peeling (JIS 5600-8-5) are evaluated.

(10) Gloss (60° Specular Gloss)

A gloss of a surface of a coated test plate is measured according to (JIS K5600-4-7 using a multi angle gloss meter (VGS (trade name) available from Nippon Denshoku Industries Co., Ltd.).

EXAMPLE 1

(Production of an Aqueous Dispersion of Fluorine-Containing Seed Polymer (B-1) Particles)

Step (I)

Into a 2 liter stainless steel autoclave were poured 500 g of ion exchange water, 2.2 g of 50% by mass aqueous solution of ammonium perfluorohexanoate (C6) (concentration of ammonium perfluorohexanoate: 2,200 ppm/water. Water is one used as a polymerization solvent, hereinafter the same), and 0.789 g of 38% by mass aqueous solution of a compound (2-1) represented by the formula (2-1):

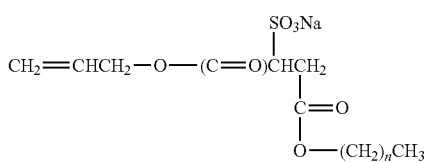

wherein the compound is a mixture of n=11 and n=12 (concentration of the compound (2-1): 600 ppm/water), and after sufficiently replacing the inside of a system with a nitrogen gas, the inside of the system was evacuated. Subsequently a pressurized monomer mixture of VdF/TFE/CTFE (=72.2/16.0/11.8 mol %) was introduced into a polymerization reactor so that a pressure inside the system became 0.75 to 0.8 MPa, followed by heating up to 70° C.

Then, a solution of a polymerization initiator prepared by dissolving 1.00 g (2,000 ppm/water) of ammonium persulfate (APS) in 4 ml of ion exchange water and 0.75 g (1,500 ppm/water) of ethyl acetate were introduced with a pressurized nitrogen gas, and a reaction was initiated with stirring at 600 rpm.

At the time when lowering of the inside pressure started as the polymerization proceeded, a monomer mixture of VdF/TFE/CTFE (=72.2/16.0/11.8 mol %) was introduced to maintain the inside pressure at 0.75 to 0.8 MPa. Seven hours and 33 minutes after starting of the polymerization, unreacted monomer were released and the autoclave was cooled to obtain an aqueous dispersion of a fluorine-containing polymer having a solid concentration of 46.1% by mass.

The copolymerization composition measured by NMR analysis was VdF/TFE/CTFE=72.1/14.9/13 (mol %). An average particle size of the obtained fluorine-containing polymer was 112.4 nm, and the number of particles in the aqueous dispersion was $5.0 \times 10^{14}$ (per 1 g of water).

200 Grams of this aqueous dispersion was subjected to freezing at −10° C. for 24 hours to be coagulated. The obtained coagulated product was washed with water and then dried to obtain a fluorine-containing polymer (A-1).

MFR of this fluorine-containing polymer (A-1) was 4.96 g/10 min. A number average molecular weight (Mn) and a weight average molecular weight (Mw) of this fluorine-containing polymer (A-1) measured by GPC were $9.12 \times 10^4$ and $4.03 \times 10^5$, respectively, and a molecular weight distribution Mw/Mn was 4.42.

Step (II)

43.94 Grams (12,900 ppm/water) of the compound of the formula (2-1) was added to 2,409.3 g of the aqueous dispersion of the fluorine-containing polymer (A-1) particles obtained in the step (I) (solid concentration: 46.2% by mass), followed by sufficiently mixing to prepare an aqueous dispersion.

Next, into a 0.5 liter separable glass flask were poured 467.5 g of methyl methacrylate (MMA), 4.8 g of butyl acrylate (BA), 4.8 g of acrylic acid (Ac), 2.4 g of mercaptan and 159.0 g of water, followed by sufficiently mixing with an emulsifier to produce a pre-emulsified solution.

The entire amount of this pre-emulsified solution was added gradually to the above aqueous dispersion of the fluorine-containing polymer, followed by sufficiently mixing, and then thereto were added 15.9 g (12,300 ppm/water) of polyethylene glycol monomethyl ether methacrylate (RMA-450 (trade name) available from Nippon Nyukazai Co., Ltd.) and 95.4 g (36,800 ppm/water) of a 50% aqueous solution of sodium salt of methacryloyloxypolyoxy alkylene sulfate (RS-3000 (trade name) available from Sanyo Chemical Industries, Ltd.) as a surfactant, followed by sufficiently mixing. The inside temperature was elevated to 75° C. and the polymerization was continued while adding 75.15 g in total of ammonium persulfate (APS) (1% by mass aqueous solution) four times every 40 minutes. Two hours after starting of the polymerization, the reaction solution was cooled to room temperature to terminate the reaction, and thus, an aqueous dispersion of a fluorine-containing seed polymer (B-1) was obtained (yield: 3,046.7 g, solid concentration: 51.7% by mass). An average particle size of the obtained seed polymer was 159.4 nm.

EXAMPLE 2

(Production of an Aqueous Dispersion of Fluorine-Containing Seed Polymer (B-2) Particles)

Step (I)

Into a 2 liter stainless steel autoclave were poured 500 g of ion exchange water and 0.789 g of 38% by mass aqueous solution of a compound (2-1) represented by the formula (2-1):

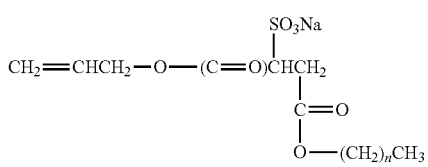

wherein the compound is a mixture of n=11 and n=12 (concentration of the compound (2-1): 600 ppm/water), and after sufficiently replacing the inside of a system with a nitrogen gas, the inside of the system was evacuated. Subsequently a pressurized monomer mixture of VdF/TFE/CTFE (=72.2/16.0/11.8 mol %) was introduced into a polymerization reactor so that a pressure inside the system became 0.75 to 0.8 MPa, followed by heating up to 70° C.

Then, a solution of a polymerization initiator prepared by dissolving 1.00 g (2,000 ppm/water) of ammonium persulfate (APS) in 4 ml of ion exchange water and 0.75 g (1,500 ppm/water) of ethyl acetate were introduced with a pressurized nitrogen gas, and a reaction was initiated with stirring at 600 rpm.

At the time when lowering of the inside pressure started as the polymerization proceeded, a monomer mixture of VdF/TFE/CTFE (=72.2/16.0/11.8 mol %) was introduced to maintain the inside pressure at 0.75 to 0.8 MPa. Seven hours and 33 minutes after starting of the polymerization, unreacted monomer were released and the autoclave was cooled to obtain an aqueous dispersion of a fluorine-containing polymer having a solid concentration of 46.1% by mass.

The copolymerization composition measured by NMR analysis was VdF/TFE/CTFE=70.2/12.8/17.0 (mol %). An average particle size of the obtained fluorine-containing polymer was 143 nm, and the number of particles in the aqueous dispersion was $7.43 \times 10^{14}$ (per 1 g of water).

200 Grams of this aqueous dispersion was subjected to freezing at −10° C. for 24 hours to be coagulated. The obtained coagulated product was washed with water and then dried to obtain a fluorine-containing polymer (A-2).

MFR of this fluorine-containing polymer (A-2) was 6.51 g/10 min. A number average molecular weight (Mn) and a weight average molecular weight (Mw) of this fluorine-containing polymer (A-2) measured by GPC were $2.36 \times 10^4$ and $7.48 \times 10^4$, respectively, and a molecular weight distribution Mw/Mn was 3.18.

Step (II)

43.94 Grams (12,900 ppm/water) of the compound of the formula (2-1) was added to 2,409.3 g of the aqueous dispersion of the fluorine-containing polymer (A-2) particles obtained in the step (1) (solid concentration: 46.2% by mass), followed by sufficiently mixing to prepare an aqueous dispersion.

Next, into a 0.5 liter separable glass flask were poured 467.5 g of methyl methacrylate (MMA), 4.8 g of butyl acrylate (BA), 4.8 g of acrylic acid (Ac), 2.4 g of mercaptan and 159.0 g of water, followed by sufficiently mixing with an emulsifier to produce a pre-emulsified solution.

The entire amount of this pre-emulsified solution was added gradually to the above aqueous dispersion of the fluorine-containing polymer, followed by sufficiently mixing, and then thereto were added 15.9 g (12,300 ppm/water) of polyethylene glycol monomethyl ether methacrylate (RMA-450 (trade name) available from Nippon Nyukazai Co., Ltd.) and 95.4 g (36,800 ppm/water) of a 50% aqueous solution of sodium salt of methacryloyloxypolyoxy alkylene sulfate (RS-3000 (trade name) available from Sanyo Chemical Industries, Ltd.) as a surfactant, followed by sufficiently mixing. The inside temperature was elevated to 75° C. and the polymerization was continued while adding 75.15 g in total of ammonium persulfate (APS) (1% by mass aqueous solution) four times every 40 minutes. Two hours after starting of the polymerization, the reaction solution was cooled to room temperature to terminate the reaction, and thus, an aqueous dispersion of fluorine-containing seed polymer (B-2) was obtained (yield: 3,078.8 g, solid concentration: 51.0% by mass). An average particle size of the obtained seed polymer was 166.6 nm.

COMPARATIVE EXAMPLE 1

(Preparation of an Aqueous Dispersion of Fluorine-Containing Seed Polymer (B-3) Particles)

Step (I)

Into a 2 liter stainless steel autoclave were poured 500 g of ion exchange water, 0.5 g of a 50% aqueous solution of ammonium perfluorooctanoate (C8) (concentration of ammonium perfluorooctanoate: 1,000 ppm/water) and 0.75 g (150 ppm/water) of polyethylene glycol monostearate (MYS-40 (trade name) available from Nikko Chemicals Co., Ltd.), and after sufficiently replacing the inside of a system with a nitrogen gas, the inside of the system was evacuated. Subsequently a pressurized monomer mixture of VdF/TFE/CTFE (=74/14/12 mol %) was introduced into a polymerization reactor so that a pressure inside the system became 1.00 to 1.10 MPa, followed by heating up to 60° C.

Then, a solution of a polymerization initiator prepared by dissolving 0.20 g (400 ppm/water) of ammonium persulfate (APS) in 4 ml of ion exchange water was introduced with a pressurized nitrogen gas, and a reaction was initiated with stirring at 600 rpm.

At the time when lowering of the inside pressure started as the polymerization proceeded, a monomer mixture of VdF/TFE/CTFE (=74/14/12 mol %) was introduced to maintain the inside pressure at 1.00 to 1.10 MPa. Three hours after starting of the polymerization, 0.20 g (400 ppm/water) of APS was introduced with a pressurized nitrogen gas. Eight hours after starting of the polymerization, unreacted monomer were released and the autoclave was cooled to obtain an aqueous dispersion of a fluorine-containing polymer having a solid concentration of 25.5% by mass.

The copolymerization composition measured by NMR analysis was VdF/TFE/CTFE=78.5/11.4/10.1 (mol %). An average particle size of the obtained fluorine-containing polymer was 115 nm, and the number of particles in the aqueous dispersion was $2.23 \times 10^{14}$ (per 1 g of water).

200 Grams of this aqueous dispersion was subjected to freezing at −10° C. for 24 hours to be coagulated. The obtained coagulated product was washed with water and then dried to obtain a fluorine-containing polymer (A-3).

MFR of this fluorine-containing polymer (A-3) was 5.15 g/10 min. Since this fluorine-containing polymer (A-3) did not dissolve in THF, measurement of a molecular weight thereof by GPC was not able to be carried out.

Step (II)

43.94 Grams (12,900 ppm/water) of the compound of the formula (2-1) was added to 2,409.3 g of the aqueous dispersion of the fluorine-containing polymer (A-3) particles obtained in the step (I) (solid concentration: 46.2% by mass), followed by sufficiently mixing to prepare an aqueous dispersion.

Next, into a 0.5 liter separable glass flask were poured 467.5 g of methyl methacrylate (MMA), 4.8 g of butyl acrylate (BA), 4.8 g of acrylic acid (Ac), 2.4 g of mercaptan and 159.0 g of water, followed by sufficiently mixing with an emulsifier to produce a pre-emulsified solution.

The entire amount of this pre-emulsified solution was added gradually to the above aqueous dispersion of the fluorine-containing polymer, followed by sufficiently mixing, and then thereto were added 15.9 g (12,300 ppm/water) of polyethylene glycol monomethyl ether methacrylate (RMA-450 (trade name) available from Nippon Nyukazai Co., Ltd.) and 95.4 g (36,800 ppm/water) of a 50% aqueous solution of sodium salt of methacryloyloxypolyoxy alkylene sulfate (RS-3000 (trade name) available from Sanyo Chemical Industries, Ltd.) as a surfactant, followed by sufficiently mixing. The inside temperature was elevated to 75° C. and the polymerization was continued while adding 75.15 g in total of ammonium persulfate (APS) (1% by mass aqueous solution) four times every 40 minutes. Two hours after starting of the polymerization, the reaction solution was cooled to room temperature to terminate the reaction, and thus, an aqueous dispersion of fluorine-containing seed polymer (B-3) was obtained (yield: 3,014.7 g, solid concentration: 51.5% by mass). An average particle size of the obtained seed polymer was 169.5 nm.

EXAMPLES 3 AND 4 AND COMPARATIVE EXAMPLE 2

(Preparation of an Aqueous Coating Composition and Coating)

Weather resistant aqueous coating compositions (white coating compositions) for construction were produced under the formulation mentioned below by using the aqueous dispersions of fluorine-containing seed polymer (B) prepared in Examples 1 and 2 and Comparative Example 1 as they were.

The obtained white coating composition was applied on an asbestos cement board (a board previously coated with an under-coating paint (DK7151 (trade name) available from Nichigo-Movinyl Co., Ltd.) to give a dried coating thickness of 150 g/m² and then dried at room temperature for one day) to give a coating thickness of 150 g/m² by using a brush, and the applied composition was dried at room temperature for one day to produce a coated board for testing.

By using this coated board for testing, resistance to freezing and thawing, hot water resistance, low temperature film forming property, foamability and gloss (60°) were evaluated. The results are shown in Table 1.

| (Formulation of white coating composition) Aqueous dispersion of fluorine-containing | |
|---|---|
| Seed polymer (B) | 65.00 parts by mass |
| Water | 9.12 parts by mass |
| Titanium oxide | 31.39 parts by mass |
| Pigment dispersing agent | 2.35 parts by mass |
| Anti-freezing agent | 1.79 parts by mass |
| pH controlling agent | 0.04 part by mass |
| Antifoaming agent | 0.11 part by mass |
| Thickener 1 | 0.38 part by mass |
| Thickener 2 | 0.40 part by mass |
| Film forming auxiliary | 2.35 parts by mass |

Each component used is as follows.
Titanium oxide: TIPAQUE CR-97 (trade name) available from ISHIHARA SANGYO KAISHA LTD.
Pigment dispersing agent: NOPCOSPERSE SN-5027 (trade name) available from SAN NOPCO LIMITED
Anti-freezing agent: Ethylene glycol
pH controlling agent: Ammonia water
Antifoaming agent: FS ANTIFOAM 013A (trade name) available from Dow Corning Corp.
Thickener 1: ADEKANOL UH-420 (trade name) available from Asahi Denka Co., Ltd.
Thickener 2: PRIMAL ASE-60 (trade name) available from Rhom & Haas Japan Limited
Film forming auxiliary: Diethyl adipate

TABLE 1

| | Example | | Com. Ex. |
|---|---|---|---|
| | 1 | 2 | 1 |
| Step (I) | | | |
| Fluorine-containing polymer (A) | A-1 | A-2 | A-3 |
| (mol %) | | | |
| VdF | 72.1 | 70.2 | 78.5 |
| TFE | 14.9 | 12.8 | 11.4 |
| CTFE | 13.0 | 17.0 | 10.1 |
| Surfactant (ppm/water) | | | |
| Compound (2-1) | 600 | 600 | — |
| C6 | 2,200 | — | — |
| C8 | — | — | 1,000 |
| MYS-40 | — | — | 150 |
| Step (II) | | | |
| Monomer for seed polymerization | | | |
| (% by mass) | | | |
| MMA | 98 | 98 | 98 |
| BA | 1 | 1 | 1 |
| Ac | 1 | 1 | 1 |
| Surfactant (ppm/water) | | | |
| Compound (2-1) | 12,900 | 12,900 | 12,900 |
| RMA-450M | 12,300 | 12,300 | 12,300 |
| RS-3000 | 36,800 | 36,800 | 36,800 |
| Characteristics of coating film | | | |
| Resistance to freezing and thawing | | | |
| Swelling | 0 | 0 | 0 |
| Cracking | 0 | 0 | 0 |
| Peeling | 0 | 0 | 0 |
| Hot water resistance | | | |
| Swelling | 0 | 0 | 1(S2) |
| Cracking | 0 | 0 | 0 |
| Peeling | 0 | 0 | 2(S1)a |
| Low temperature film forming property | | | |
| Swelling | 0 | 1(S1) | 0 |
| Cracking | 0 | 0 | 0 |
| Peeling | 0 | 0 | 0 |
| Foaming property (mm) | | | |
| Immediately after shaking | 2 | 2 | 8 |
| 30 minutes after shaking | 0 | 0 | 3 |
| Gloss | 64 | 59 | 54 |

"0" in the columns of resistance to freezing and thawing, hot water resistance and low temperature film forming property of Table 1 indicates that there was neither the swelling, cracking nor peeling at all.

From Table 1, it is seen that the adhesion to a substrate, foamability and gloss were improved by using the compound (2-1) as a surfactant in the step (I).

The invention claimed is:
1. A method for producing an aqueous dispersion of fluorine-containing seed polymer (B) particles, comprising:
(I) a step for preparing an aqueous dispersion of fluorine-containing polymer (A) particles by polymerization of monomer comprising at least one fluoroolefin in an aqueous dispersion in the presence of a compound (1) represented by the formula (1):

$$CH_2=CHCH_2-O-R \quad (1)$$

wherein R is a hydrocarbon group which may have an oxygen atom, a nitrogen atom and/or a polar group, and (II) a step for seed-polymerizing ethylenically unsaturated monomer with the fluorine-containing polymer (A) particles in the aqueous dispersion of the fluorine-containing polymer (A) particles, and the compound (1) is a compound (2) in which R in the formula (1) is represented by the formula (2):

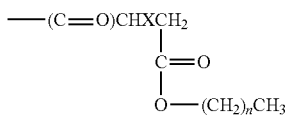  (2)

wherein X is H or $SO_3Y$ (Y is $NH_4$ or an alkali metal atom); n is an integer of 0 to 19, a compound (3) in which R in the formula (1) is represented by the formula (3):

  (3)

wherein AO is a straight chain or branched chain oxyalkylene group having 2 to 4 carbon atoms; p is a positive integer; X is H or $SO_3Y$ (Y is $NH_4$ or an alkali metal atom); and AO may be the same or different when plural and may form two or more block structures, or a compound (4) in which R in the formula (1) is represented by the formula (4):

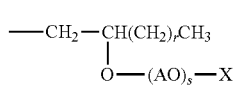  (4)

wherein AO is a straight chain or branched chain oxyalkylene group having 2 to 4 carbon atoms; X is H or $SO_3Y$ (Y is $NH_4$ or an alkali metal atom); r is an integer of 0 to 20; s is a positive integer; and AO may be the same or different when plural and may form two or more block structures.

2. The production method of claim 1, wherein in the step (II), the compound (1) is allowed to exist in a polymerization system.

3. The production method of claim 1, wherein the fluoroolefin includes at least one fluoroolefin selected from the group consisting of vinyl fluoride, vinylidene fluoride, tetrafluoroethylene, hexafluoropropylene and chlorotrifluoroethylene.

4. An aqueous coating composition comprising the fluorine-containing seed polymer (B) particles obtained by the production method of claim 1.

5. A coated article having a coating film formed by applying the aqueous coating composition of claim 4.

* * * * *